United States Patent
Gupta et al.

(10) Patent No.: US 10,440,178 B2
(45) Date of Patent: Oct. 8, 2019

(54) CALLER ID VERIFICATION USING CALL IDENTIFICATION AND BLOCK LISTS

(71) Applicant: PINDROP SECURITY, INC., Atlanta, GA (US)

(72) Inventors: Payas Gupta, Atlanta, GA (US); Terry Nelms, II, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 16/289,957

(22) Filed: Mar. 1, 2019

(65) Prior Publication Data
US 2019/0281158 A1 Sep. 12, 2019

Related U.S. Application Data

(60) Provisional application No. 62/640,873, filed on Mar. 9, 2018.

(51) Int. Cl.
| | |
|---|---|
| *H04W 12/06* | (2009.01) |
| *H04M 3/436* | (2006.01) |
| *H04W 4/16* | (2009.01) |
| *H04M 3/42* | (2006.01) |

(52) U.S. Cl.
CPC ....... *H04M 3/436* (2013.01); *H04M 3/42059* (2013.01); *H04W 4/16* (2013.01); *H04W 12/06* (2013.01)

(58) Field of Classification Search
None
See application file for complete search history.

(56) References Cited

U.S. PATENT DOCUMENTS

| | | |
|---|---|---|
| 8,135,119 B1 | 3/2012 | Zhao et al. |
| 8,254,541 B2 | 8/2012 | Cai |
| 9,001,985 B2 | 4/2015 | Cox et al. |
| 9,060,057 B1 | 6/2015 | Danis |
| 9,332,119 B1 | 5/2016 | Danis |
| 9,531,695 B2 | 12/2016 | Koppolu et al. |

(Continued)

OTHER PUBLICATIONS

Mustafa et al., You Can Call But You Can't Hide: Detecting Caller ID Spoofing Attacks, http://ieeexplore.ieee.org/document/6903577/, Jun. 26, 2014, 20 pages.

(Continued)

*Primary Examiner* — Suhail Khan
(74) *Attorney, Agent, or Firm* — Eric L. Sophir; Dentons US LLP

(57) ABSTRACT

In an illustrative embodiment, a user device may block all the phone numbers used by an enterprise. When an enterprise wants to call the user, the enterprise may notify the user device through a separate secure channel that an enterprise phone number is in the process of making a phone call to the user device. The secure channel may include an authentication server that may request the user device to unblock the enterprise phone number. An incoming phone call from the enterprise phone number therefore can be trusted. After the phone call is terminated, the user device may again block the enterprise phone number. An attacker may not have access to the authentication server and a phone call from the attacker with a spoofed enterprise phone number (now blocked) may be dropped by the user device.

9 Claims, 6 Drawing Sheets

(56) References Cited

U.S. PATENT DOCUMENTS

| | | |
|---|---|---|
| 9,544,440 B2 | 1/2017 | Deng et al. |
| 9,549,062 B1 | 1/2017 | Yaung et al. |
| 9,762,728 B1 | 9/2017 | Cox et al. |
| 9,781,255 B1 | 10/2017 | Gailloux et al. |
| 9,800,612 B2 | 10/2017 | Harvey et al. |
| 2007/0116227 A1 | 5/2007 | Vitenson et al. |
| 2008/0219177 A1 | 9/2008 | Flynn et al. |
| 2009/0097630 A1 | 4/2009 | Fotta |
| 2010/0330960 A1* | 12/2010 | Ravishankar ....... H04M 3/2281 455/410 |
| 2011/0183652 A1 | 7/2011 | Eng et al. |
| 2011/0211572 A1 | 9/2011 | Campion et al. |
| 2015/0373193 A1 | 12/2015 | Cook |
| 2017/0163803 A1 | 6/2017 | Russell |

OTHER PUBLICATIONS

Android Phone Application to Detect Malicious Cell Phone Spoofing, https://cse.sc.edu/files/Laurie%20Dening.pdf, Apr. 3, 2018, 8 pages.

Notification of Transmittal of the International Search Report and the Written Opinion of the International Searching Authority, dated May 15, 2019, issued in corresponding International Application No. PCT/US2019/021063, 14 pages.

* cited by examiner

300

CALLER ID VERIFICATION USING CALL IDENTIFICATION AND BLOCK LISTS

CROSS-REFERENCE TO RELATED APPLICATIONS

This application claims priority to U.S. Provisional Application No. 62/640,873, filed Mar. 9, 2018, which is hereby incorporated by reference in its entirety.

This application is also related to U.S. Non-Provisional application Ser. No. 16/287,879, filed Feb. 27, 2019, which is incorporated by reference in its entirety.

TECHNICAL FIELD

This application relates generally to telephone security and more specifically to verifying an identity of an incoming call utilizing block lists and identification lists.

BACKGROUND

Phone calls are used for a significant amount of communications and present a large target for attack. Caller identification (also referred to as caller ID) features that display an originating phone number in callee's device are prone to spoofing. For example, caller ID spoofing is commonly used by attackers to imitate a call agent of an enterprise (e.g., bank) and call the enterprise customers. A customer may have saved the enterprise phone number in a contact list or may otherwise recognize the enterprise phone number. Receiving a phone call from a known phone number, the customer may believe that the attacker is indeed a call agent of the enterprise. The attacker may then use social engineering to obtain other personal private information from the customer such as credit card information, social security number, and address.

Conventional technology does not provide an indication to the user whether a phone number of an incoming call is spoofed. As customers do not generally recognize enterprise call agents by voice or other attributes, the customers and enterprises remain vulnerable to these spoofing attacks.

SUMMARY

What is therefore desired are systems and methods that provide an indication to a callee whether an incoming call can be trusted. What is also desired are systems and methods that provide a verification to a callee that incoming phone calls are from enterprise (e.g., a bank) phone numbers and not from spoofed phone numbers.

Embodiments disclosed herein attempt to solve the aforementioned technical problems and may provide other benefits as well. In an illustrative embodiment, a user device (e.g., a mobile phone) may block all the phone numbers used by an enterprise, e.g., by adding to a block list. When an enterprise wants to call the user, e.g., through a call agent or an automated dial, the enterprise may notify the user device through a separate secure channel that an enterprise phone number is in the process of making a phone call to the user device. The secure channel may include an authentication server that sends one or more requests to the user device. In response, the user device may unblock the enterprise phone number. An incoming phone call from the enterprise phone number therefore can be trusted. After the phone call is terminated, the user device may again block the enterprise phone number. An attacker may not have access to the secure channel to notify the user device of an incoming call. Therefore, a phone call from the attacker with a spoofed enterprise phone number (blocked by the user device) may be dropped by the user device. For a verified phone number, the user device may display an icon or a symbol to the user that incoming phone number displayed in the screen has been verified.

In an embodiment, a computer-implemented method comprises receiving, by a first computer from a second computer, an indication of an outgoing phone call to a first phone number from a second phone number; transmitting, by the first computer, a first request to a user device associated with the first phone number to remove the second phone number from a block list maintained at the user device; in response to the first computer receiving a confirmation message that the user device has removed the second phone number from the block list, transmitting, by the first computer to the second computer, an indication that the outgoing phone call can be placed; and, transmitting, by the first computer to the user device, a second request to add the second phone number to the block list such that the user device blocks future calls from the second phone number.

In another embodiment, a computer-implemented method comprises appending, by the authentication function in a user device, the set of phone numbers to a block list; receiving, by the authentication function from an authentication server, a first request to remove a first phone number in the set of phone numbers; removing, by the authentication function, the first phone number from the block list in response to the first request; receiving, by the user device, an incoming phone call from the first phone number; receiving, by the authentication function, a second request to add the first phone number to the block list; and appending, by the authentication function, the first phone number to the block list in response to the second request such that the user device blocks a future incoming call from the first phone number.

In yet another embodiment, a system comprises a non-transitory storage medium storing a plurality of computer program instructions; and a processor configured to execute the plurality of computer program instructions to: receive from a computer an indication of an outgoing phone call to a first phone number from a second phone number; transmit a first request to a user device associated with the first phone number to add the second phone number to an identification list maintained at the user device; transmit a confirmation to the computer that the outgoing phone call can be placed to the first phone number; and in response to the processor receiving a confirmation message that the outgoing phone call has been initiated: transmit a second request to the user device to remove the second phone number from the identification list.

In yet another embodiment, a computer-implemented method comprises receiving, by a first computer from a second computer, an indication of an outgoing phone call to a first phone number from a second phone number; transmitting, by the first computer, a first request to a user device associated with the first phone number to add the second phone number to an identification list maintained at the user device; transmitting, by the first computer, a confirmation to the second computer that the outgoing phone call can be placed to the first phone number; and in response to the first computer receiving a confirmation message that the outgoing phone call has been initiated, transmitting, by the first computer, a second request to the user device to remove the second phone number from the identification list.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
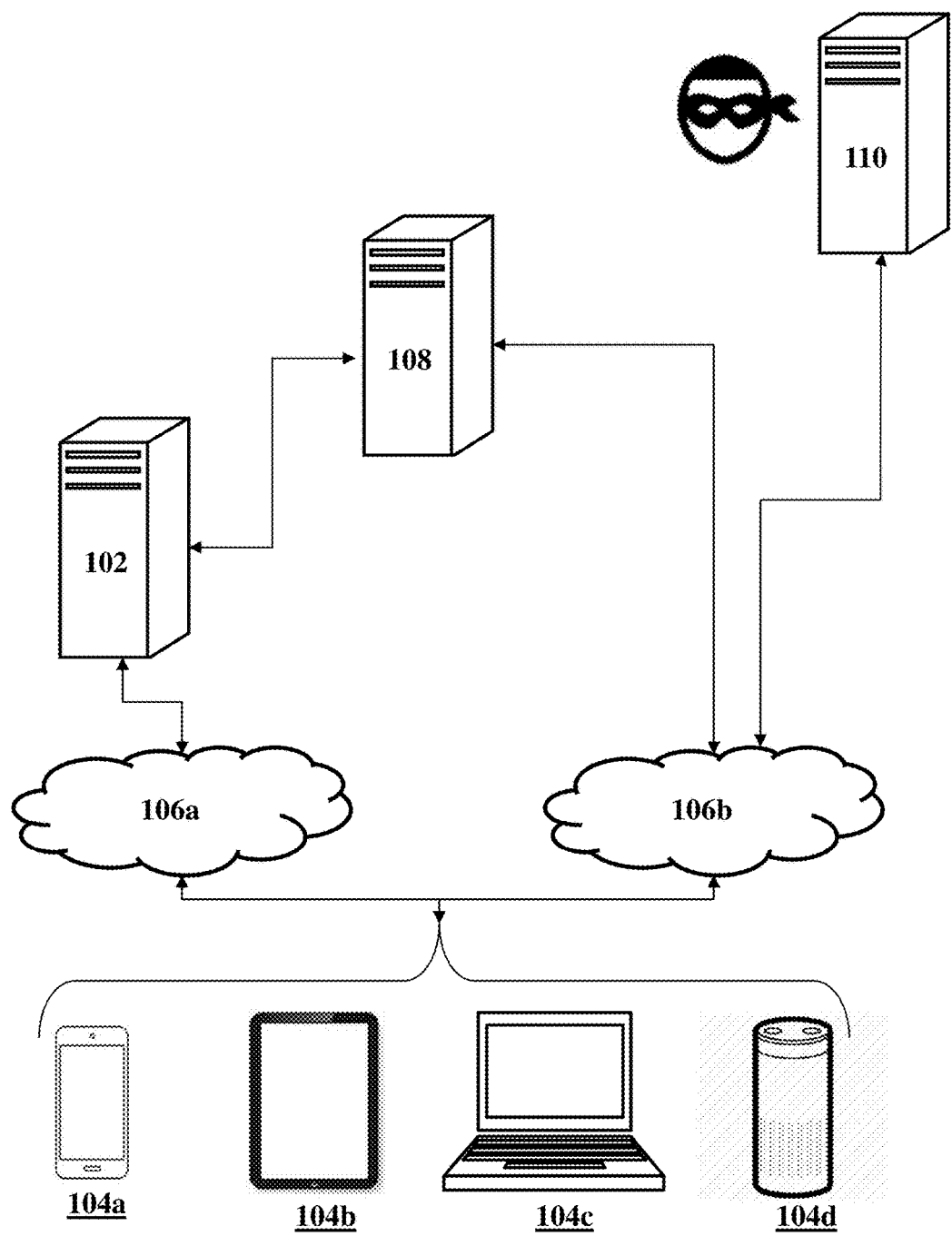
FIG. 1A shows an illustrative network environment for caller ID verification using call identification and block lists, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for caller ID verification using block lists and identification lists. An illustrative system may comprise an authentication server and an authentication function on a user device. The authentication function may be executed by (or implemented by) an authentication application (or app) that may be an enterprise app, for example, banking app. The authentication function may be executed by a system utility of the user device or may be a part of a service running on the user device. The authentication function may communicate with the authentication server to fetch all the phone numbers (also referred to as automatic number identification (ANI)) associated with an enterprise. The authentication function may then add the fetched numbers to a block list maintained at the user device (e.g., in a storage of the user device). The user device may block incoming calls from the phone numbers in the block list.

When the enterprise wants to place an outgoing phone call to the user device, the enterprise may transmit a message indicating the outgoing phone call along with an enterprise phone number from which the outgoing call will be originated. In some embodiments, the outgoing phone call may not originate from the enterprise phone number. For example, an agent calling a user may use a different phone number or may use a Voice over Internet Protocol (VoIP) phone with an associated VoIP phone number. In these embodiments, the different originating phone number may be mapped to the enterprise phone number. The authentication server may therefore receive an originating phone number and a mapped enterprise phone number in the message. In response to receiving the message, the authentication server may transmit a request to the authentication function. The request may include a request to the authentication function to remove the enterprise phone number (which, in some cases, is mapped from a different originating phone number) from a block list maintained at the user device. For example, the block list may be within a storage such as a hard disk drive, solid state drive, and/or a random access memory of the user device. In some embodiments, the request to the authentication may be a request to disable the entire block list. In addition, the request may include a request to add the phone number to an identification list, also maintained at the user device. In response, the authentication function may remove the phone number from the block list and may add the phone number to the identification list and transmit a confirmation message to the authentication server. When the authentication server receives the confirmation message, the authentication server may notify the enterprise sever that an outgoing phone call may be placed from the enterprise phone number to a phone number associated with the user device.

After the enterprise places the outgoing phone call to the user device, the authentication server may send another request to the authentication function to add the enterprise phone number back to the block list. In some embodiments, the authentication server may send the request after the authentication server receives a notification that the call between the enterprise and the user device has been disconnected. In other embodiments, the authentication server may send the request when the call between the enterprise and the user device is ongoing. It should be understood that the aforementioned state of the phone calls where the authentication server may send the request (or any type of message) are merely illustrative and should not be considered limiting. For example, the authentication server may send the request at any time after a phone call is placed to the user device (e.g., any time after the user device starts ringing). Non-limiting example of the state of the phone calls may include off-hook, ringing, connected, and disconnected. The request may also include a request for the authentication function to remove the enterprise phone number from the identification list. In some embodiments, the user device may not receive a message to remove the enterprise phone number from the identification list and the user device may remove the enterprise phone number after a timeout. In other embodiments, the authentication server may transmit the user device a request to remove the enterprise phone number after a timeout.

Once the phone call to the user device is ongoing, the authentication server may transmit a request to the user device to get the user device state. The call states may be, for example, incoming ringing, incoming connected. In some embodiments, the user device may send the state data back to the authentication server when the user device receives the phone call and starts ringing without an additional request from the authentication server, i.e., the user device may send the state data based on previously received requests to modify one or more of the block lists and identification lists. The authentication server may compare the received user device state with the phone call state to authenticate that the user device which received the phone call is the same device that was supposed to receive the phone call and that the phone number has not been ported or the phone call has not been forwarded from the user device. Authentication based on comparing state of a device and the state of a phone call is disclosed in U.S. patent application Ser. No. 16/287,879, which is incorporated by reference herein in its entirety.

As the enterprise phone number is added back to the block list, any call to the user device from a spoofed enterprise phone number is blocked by the user device. When the enterprise itself makes a call, the enterprise may communicate with the user device through a secure channel (e.g., using the authentication server as described above) to remove the enterprise phone number from the block list. However, an attacker that has spoofed the enterprise phone number may not have access to the secure channel to cause the user device to remove the enterprise phone number from the block list. Therefore, the user device may automatically block calls from a spoofed enterprise phone number.

FIG. 1A shows an illustrative network environment 100a for caller ID verification using block lists and identification lists, according to an embodiment. As shown, the network environment 100a may comprise an authentication server 102, one or more user devices 104a, 104b, 104c, 104d (collectively or commonly referred to as 104), one or more networks 106a, 106b (collectively or commonly referred to as 106), and an enterprise server 108. The network environment 100 may also comprise an attack device 110 used for spoofing phone numbers associated with the enterprise server 108 and call the client devices 104.

The authentication server 102 may be any kind of computing devices containing computer program instructions to perform the authentication functions described herein. Non-limiting examples of the authentication server 102 include a server computer, a laptop computer, a tablet computer, and a smartphone. The authentication server 102 may be logically and physically organized within the same or different devices or structures, and may be distributed across any number of physical structures and locations (e.g., cabinets, rooms, buildings, cities). The authentication server 102 may comprise a processor to execute the computer program instructions, a memory to store results generated by the processor, and a storage to store the computer program instructions and one or more databases.

The user devices 104 may include any kind of computing devices configured to receive phone call. The phone calls may be through telephone exchanges or over internet protocol. Non-limiting examples of user devices 104 include a smartphone 104a, a tablet computer 104b, a laptop computer 104c, and a voice enabled personal assistant 104d (also referred to as a smart speaker). It should be understood that the user devices 104 shown in FIG. 1 are merely illustrative and other user devices such as smartwatches and desktop computers should be considered to be within the scope of this disclosure. A user device 104 may include a processor configured to execute computer program instructions and a memory to store one or more results of the executions. The user device 104 may include a storage for storing computer program instructions and one or more databases. The user device may further have hardware and software to enable network functionalities to interact with the networks 106.

A user device 104 may have an authentication function. In some embodiments, the authentication function may be executed by an authentication application (also referred to as an authentication app) installed thereon. In other embodiments, the authentication function may be executed by a system utility of the user device 104. Additionally or alternatively, the authentication function may be executed by a service running on the user device 104. The authentication function may interact with the authentication server 102 to execute one or more authentication operations described herein. More particularly, the authentication function may receive instructions (e.g., requests) from the authentication server 102 and execute one or more operations based upon the instructions.

The networks 106 may include any type of network, including but not limited to, Local Area Network (LAN), Wireless Local Area Network (WLAN), Metropolitan Area Network (MAN), Wide Area Network (WAN), cellular network, and the Internet. The communication over the networks 106 may be performed in accordance with various communication protocols, such as Transmission Control Protocol and Internet Protocol (TCP/IP), User Datagram Protocol (UDP), and IEEE communication protocols. In some embodiments, the network 106a may be a secured network and the network 106b may be a secured network.

The enterprise server 108 may be any kind of computing device of an enterprise (e.g., a bank). Non-limiting examples of the enterprise server 108 include a server computer, a laptop computer, a tablet computer, and a smartphone. The enterprise server 108 may be an IVR server providing interactive and automated responses to customer calls arising from the user devices 104. The enterprise server 108 may be a call center server receiving and routing calls from the user devices 104. In a call center setting, the enterprise server 108 may also provide computing functionality to assist the operations performed by call center agents.

The attack device 110 may be any kind of computing device that attackers may use for phone number or caller ID spoofing. The attack device 110 may include hardware and software modules to make calls to the user devices 104 through the networks 106. An attacker or an imposter may use the attack device 110 to make malicious phone calls using spoofed phone numbers to the user devices 104 and perform social engineering to gather other information about the users associated with the user devices 104.

In operation, the authentication function in a user device 104 may instruct the user device 104 to add phone number associated with the enterprise server 108 to a block list. The authentication function may generate the instructions based upon a request from the authentication server 102. Therefore, when an attacker uses the attack device 110 to spoof a phone number associated with the enterprise server 108 and call the user device 104, the user device 104 may decline the phone call. The user device 104 may decline the phone call automatically, and the user may not even notice the incoming phone call.

However, when the enterprise in the process of making the call, the enterprise server 108 may send a notification to the authentication server 102 that the enterprise seeks to make a call to a user device 104. The notification to the authentication server 102 may include a phone number that the enterprise will use to call the user device 104. The authentication server 102 may then transmit a request to the user device 104 to unblock the phone number. An authentication function in the user device 104 may receive the request and, in response, may instruct the user device 104 to remove the phone number from the block list. In some embodiments, the authentication server 102 may instruct the user device 104 to disable the entire block list. Once the user device 104 removes the phone number from the block list (or disables the entire block list), the authentication function in the user device 104 may transmit a confirmation of the removal to the authentication server 102. The authentication server 102 may in turn may send a confirmation to the enterprise server 108. Upon receipt of the confirmation, the enterprise server 108 or an agent may call the user device 104 using the phone number. When the user sees the phone number making the incoming call, the user may trust that the phone number is not spoofed. In some embodiments, the user device 104 may show a graphical indication or any other symbol that the incoming call has been verified by the authentication server 102.

When the phone call is completed, e.g., when the user hangs up, the authentication function may send an indication to the authentication server 102 that the phone call is completed. Alternatively or additionally, the enterprise server 108 may send an indication that the phone call is completed to the authentication server 102. In response, the authentication server 102 may instruct the authentication function in the user device to add the phone number back to the block list. Alternatively, when the phone call is completed, the authentication function itself may instruct the user device 104 to add the phone number back to the block list. It should be understood that the embodiment of adding the phone number back to the block list at the end of the phone call is merely illustrative. The phone number can be added back to the block list by the user device 104, with or without instructions from the authentication server 102, at any time after the initiation of the phone call to the user device 104. For example, the phone number may be added back the block list when the user device 104 starts ringing or at any time during the pendency of the phone call. In some embodiments, the user device 104 may add the phone number back to the block list after a timeout.

The aforementioned communications (e.g., request transmissions) between the authentication function in the user device 104 and the authentication server 102 may be through any Internet Protocol (IP) channel or mobile message channel. For example, the communications may be through IP channels such as Apple Push Notification Service (APNS), Google Cloud Messaging (GCM), or Firebase Cloud Messaging (FCM) or mobile message channel such as Short Message Service (SMS), Rich Communication Services (RCS), or Multimedia Messaging Service (MMS). The mobile message channel may be used when there is low or intermittent Internet connectivity between the user device 104 and the authentication server 102. It should however be understood that these channels of communications are merely illustrative and other channels of communications are to be considered to be within the scope of this disclosure.

In some embodiments, the user device 104 may maintain only an identification list without a block list. For example, the authentication function in the user device 104 may create entries in the identification list for the phone numbers with the corresponding enterprise name. The authentication function may also create entries for the same phone numbers with names such as suspicious, blacklist, spam, and/or scam caller. In response to receiving a request from the authentication server 102 to remove a phone number of an enterprise from the suspicious caller list, the authentication function may remove the phone number such that the user device 104 may receive a call from the phone number. The user device 104 may therefore show that the call is coming from the enterprise. After a certain period of removal from the suspicious caller list (e.g., a timeout, a request from the authentication server 102), the authentication function may add the phone number back to the suspicious caller list.

In some embodiments, the authentication function in the user device 104 may detect an incoming call from a phone number and change the entries in one or more of the identification list and the block list based upon fetching data from the authentications server 102. For example, the authentication function may fetch the data associated with the phone number from the authentication server 102. If the data fetched from the authentication server 102 indicates that an enterprise associated with the phone number has communicated with the authentication server 102 about the incoming call, the authentication function may remove the phone number from the block list and/or add the phone number to the identification list in real-time. The authentication function may then associate the incoming call with the enterprise and request the user device 104 to display the name of the enterprise (e.g., change the caller ID of the call from displaying a phone number to displaying the name of the enterprise) in real-time. If the fetched data indicates that the enterprise associated with the phone number has not communicated with the authentication server 102, the authentication function may request the user device 104 to indicate that the call is likely spam or from a spoofed phone number (e.g., change the caller ID in real time to display "Likely Spam").

Figure 1B:
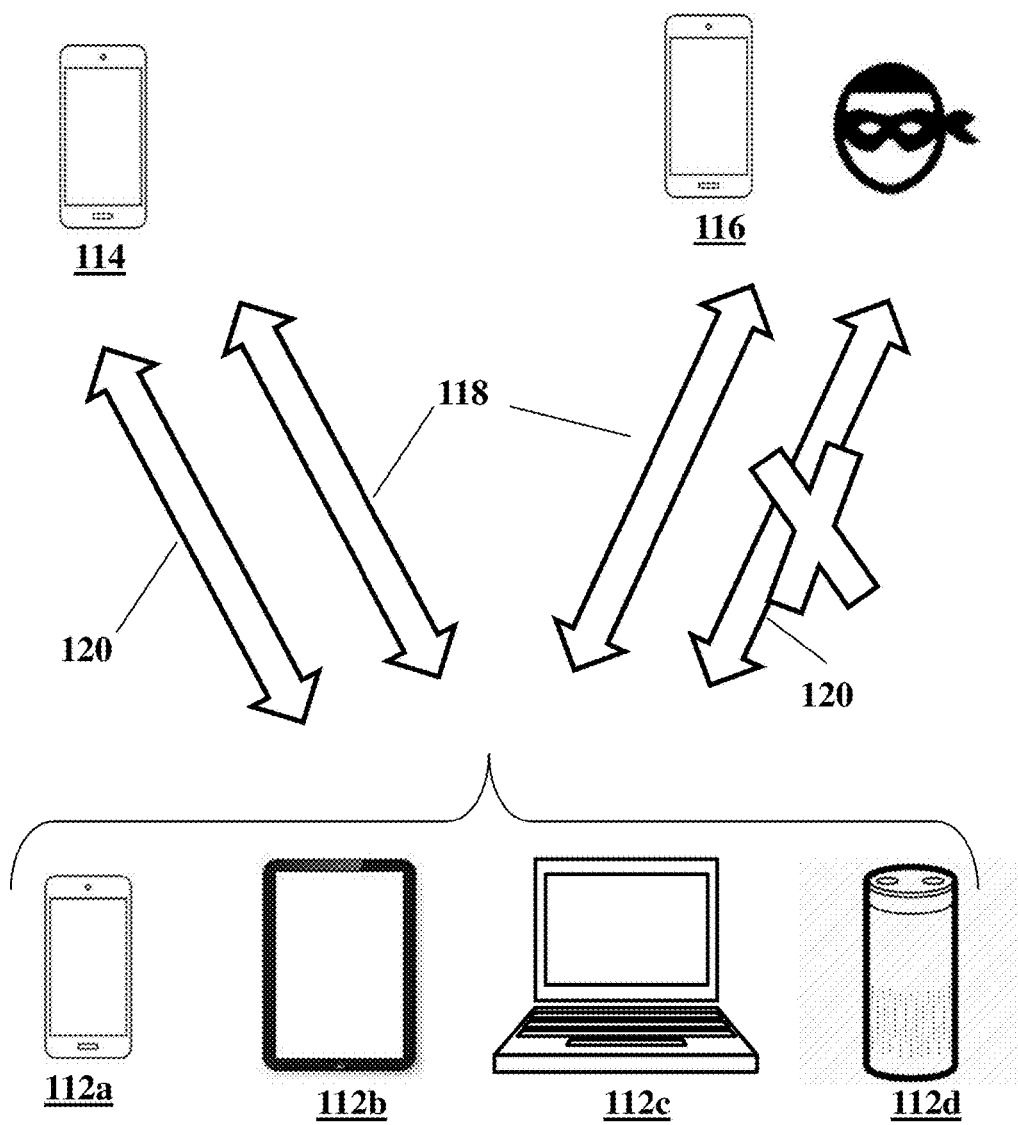
FIG. 1B shows another illustrative network environment for caller ID verification using call identification and block lists, according to an embodiment.

FIG. 1B shows another illustrative network environment 100b for caller ID verification using block lists and identification lists, according to an embodiment. The illustrative network environment 100b may comprise user devices 112a-112d (collectively or commonly referred to as user devices 112), 114, an imposter user device 116, a telephony channel 118, and a secure channel 120. As shown, a user device 112 may receive a phone call from the user device 114 or the imposter user device 116 through the telephony channel 118. An imposter may therefore use the imposter user device 116 to make a call to a user device 112 spoofing the phone number associated with the user device 114 (i.e., a legitimate device).

To mitigate such attacks, the user devices 112, 114 may contain a corresponding authentication function. The authentication function may be provided by an authentication application, a system utility of the corresponding user device 112, 114, a service being executed by the corresponding user device 112, 114, and/or other software modules. Through the authentication functions in the user devices 112, 114, the illustrative network environment 100b may provide a secure channel 120 to securely exchange information about a phone call through the telephony channel 118. The imposter user device 116 may not have the authentication function and may not be able to access the secure channel 120.

In an illustrative operation, the user device 114 may initiate a call to another user device, e.g., user device 112a. The user device 112a may maintain a block list and an identification list. The block list may include a phone number associated with the user device 114. The authentication function in the user device 114 may detect that a call is being initiated to the user device 112a, e.g., when the user of the user device 114 initiates a phone application and dials the phone number associated with the user device 112a, and/or provides any other indication of the phone call. The authentication function in the user device 114 may then transmit a request to the user device 112a to remove the phone number associated with the user device 114 from the block list (or disable the entire block list). The request may also be for the user device 112a to add the phone number associated with the user device 114 to the identification list maintained at the user device 112a. An authentication function at the user device 112*a* may receive the request and remove the phone number associated with the user device 114 from the block list (or disable the entire block list). The authentication function may also add the phone number associated with the user device 114 to the identification list. The authentication function at the user device 112*a* may then transmit a confirmation message to the user device 114 indicating that the phone number associated with the user device 114 has been removed from the block list and/or added to the identification list such that the user device 114 may place the phone call to the user device 114.

At any point after the initiation of the phone call from the user device 114 to user device 112*a*, the phone number associated with the user device 114 may be added back to the block list and/or removed from the identification list. For example, once the authentication function at the user device 112*a* detects that an incoming call from the phone number associated with the user device 114 is ringing, has been picked up, or has ended, the authentication function may add the phone number associated with the user device 114 back to the block list. The authentication function may also remove the phone number associated with the user device 114 from the identification list. In some embodiments, the authentication function at the user device 112*a* may perform these adding and removing operations after a timeout. In some embodiments, the authentication function at the user device 112*a* may perform these operations based upon one or more requests received from the authentication function in the user device 114 (e.g., a request to add the phone number associated with the user device 114 back to the block list). However, the imposter user device 115 may not have an authentication function or any other way to use the secure channel 120 to communicate with the client device 112*a*. Therefore, if the imposter user device 115 makes a phone call using a phone number spoofing the user device 114, the client device 112*a* may automatically decline the phone call as the phone number associated with the user device is in the block list.

The aforementioned communications in the secure channel 120 between the authentication function in the user device 114 and the authentication function in the user device 112*a* may be through any Internet Protocol (IP) channel or mobile message channel. For example, the communications may be through IP channels such as APNS, GCM, or FCM or mobile message channel such as SMS, RCS, or MMS. The mobile message channel may be used when there is low or intermittent Internet connectivity between the user device 114 and the user device 112*a*. It should however be understood that these channels of communications are merely illustrative and other channels of communications are to be considered to be within the scope of this disclosure.

In some embodiments, the user device 112*a* may maintain only an identification list without a block list. For example, the authentication function in the user device 112*a* may create entries in the identification list of a phone number of the user device 114 in association with an identification of a user of the user device 114. The authentication function may also create entries for the same phone number with names such as suspicious, blacklist, spam, and/or scam caller. In response to receiving a request from the user device 114 to remove the phone number from the suspicious caller list, the authentication function may remove the phone number such that the user device 112*a* may receive a call from the phone number. The user device 112*a* may therefore show that the call is coming from the user of the user device 114. After a certain period of removal from the suspicious caller list (e.g., a timeout, a request from the user device 114), the authentication function may add the phone number back to the suspicious caller list.

Figure 2:
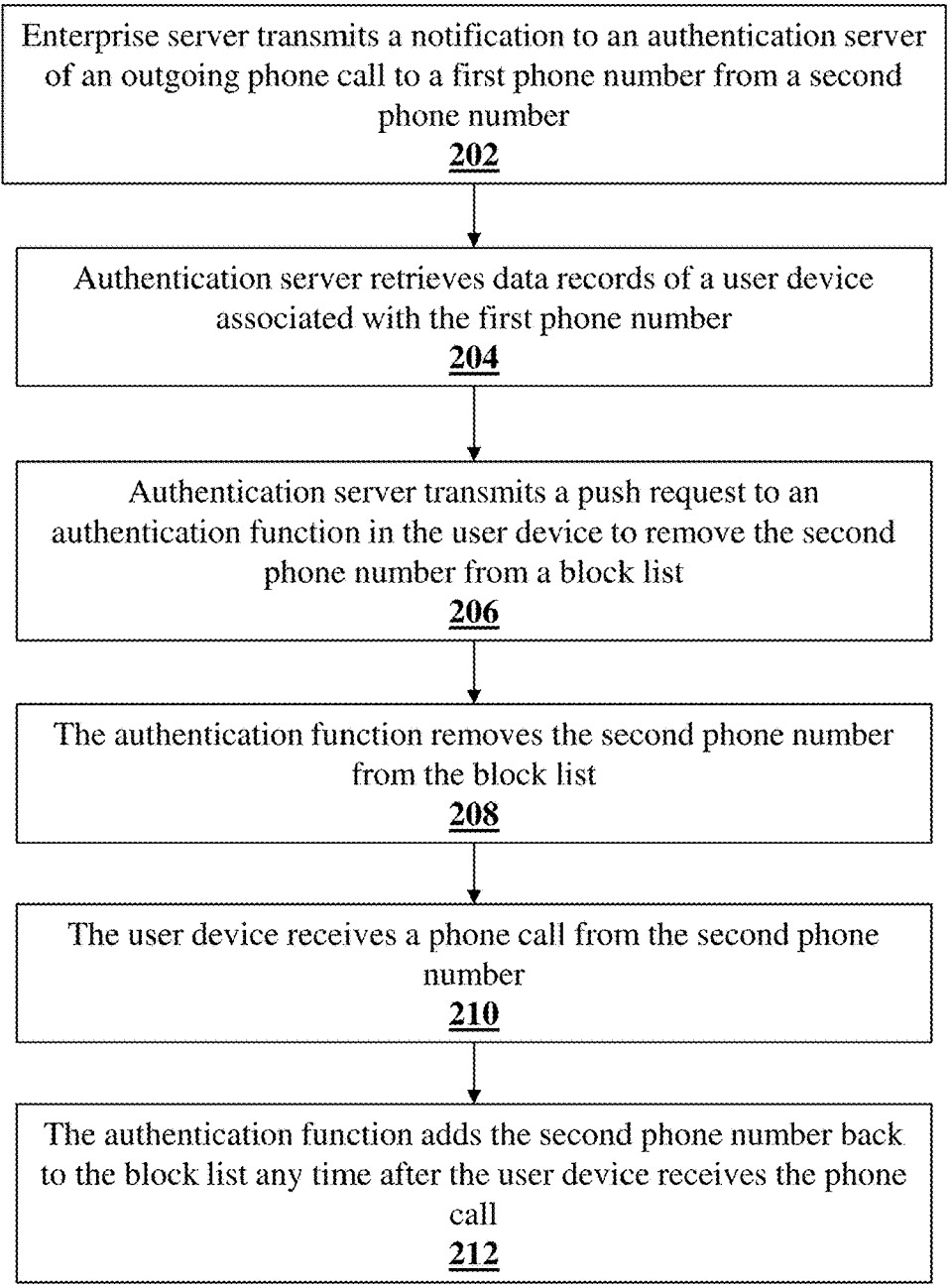
FIG. 2 shows a flow diagram of an illustrative method of caller ID verification using call identification and block lists, according to an embodiment.

FIG. 2 shows a flow diagram of an illustrative method 200 of caller ID verification using block lists and identification lists, according to an embodiment. It should be understood that the steps described herein are merely illustrative and additional, alternative, or fewer number of steps are to be considered to be within the scope of this disclosure.

The method 200 may begin at step 202, when an enterprise server transmits a notification to an authentications server of an outgoing phone call to a first phone number from a second phone number. The enterprise server may be associated with an enterprise (e.g., a bank) or a call center using the second phone number. In some embodiments, the enterprise server may be an Interactive Voice Response (IVR) server using the second phone number. In these embodiments, the IVR server may automatically transmit a notification to the authentication server that the IVR server is the processing of making a phone call to the first phone number using the second phone number. In the embodiments where the enterprise server is a call center server, an agent may request the call center server to send the notification to the authentication server that that the agent is in a process of making a phone call using the second phone number to the first phone number. The notification may include the second phone number, i.e., the phone number being used to make the phone call. In some embodiments, a single server may implement the functionality of the enterprise server and the authentication server and the above described communications may be between different software modules of the single server.

At a next step 204, the authentication server may retrieve data records associated with the first phone number. The authentication server may maintain or have access to a database with data records that associates user devices with the first phone number. For example, the first phone number may be associated with a mobile phone and the data records of the first phone number may have information about the mobile phone. For example, the data records of the first phone number may include an internet protocol (IP) address, a MAC address or any other kind of address of the mobile phone. It should be understood that aforementioned information of the mobile phone is merely illustrative and other information that allows the authentication server to communicate with the user device should also be considered within the scope of this disclosure.

At step 206, the authentication server may transmit a request to an authentication function in the user device to remove the second phone number from a block list. The request may be through IP channel, using platforms such as Apple Push Notification Service (APNS), Google Cloud Messaging (GCM), or Firebase Cloud Messaging (FCM). In some embodiments, the request may be through mobile message channel, such as SMS, RCS, or MMS. The authentication server may utilize the mobile message channel when the user device may have a poor internet connectivity. The request may also include a request to add the second phone number to an identification list in addition to removing the phone number from the block list. Each of the block list and the identification list may be maintained at the user device (e.g., in a storage). In some embodiments, the request to the authentication function may be disable the entire block list.

At step 208, the authentication function in the user device may remove the second phone number from the block list (or may disable the entire block list). In addition, the authentication function may add the second phone number to the identification list. After the second phone number is removed from the block list and added to the identification list, the user device may not block an incoming phone call from the second phone number.

In addition, the authentication function may provide a notification to the user that an incoming call is about to arrive. The notification may be a visual notification (e.g., a banner notification), an audible notification (e.g., a beep or music), and/or a haptic notification. The authentication function may also detect one or more settings at the user device and/or the state of the user device. For example, the user may have enabled a "do not disturb" setting and/or the state of the user device may indicate that the user is otherwise busy (e.g., the state of the user device may indicate an ongoing phone call). In these cases, the authentication function may transmit an indication to the authentication server that the user may not be available to the take the phone call. The authentication server may utilize the notification to instruct the enterprise server not to make a phone call. Alternatively, the authentication function may instruct the user device not reject the incoming phone call and provide only the notification to the user.

At step 210, the user device receives the phone call originating from the second phone number. The user device may display on the screen that the incoming phone call is verified. For example, the user device may display an image and/or a text such as a checkmark as an indication that the incoming phone call may be trusted. The authentication server may provide displayed image and/or text to the authentication function in the user device. Other examples of the image and/or text may include "Call Verified by <Company A>."

In some embodiments, the authentication server may also provide an image of the enterprise or the person that is calling to the authentication function so that the user device may display the image when displaying the incoming call. The authentication server may also provide and the user device may accordingly display a context of the incoming call. The context may be in a text form and/or in an image form, such as "fraud on your credit card." The user device may also play a different ringtone for the call that is verified using the embodiments in this disclosure. In the embodiments where the user device is an IoT device, the user device may display different notification colors based on whether the call is verified. For example, the IoT device may display a green color notification (e.g., by activating green LEDs) for a call that has been verified and display a red color notification for a call that is likely spam (e.g., by activating red LEDs). The images, texts, and/or indications displayed by the user device may be provided by the authentication server as metadata to the authentication function at the user device. Such metadata may be embedded within one or more requests from the authentication server to the authentication function. Alternatively or additionally, the authentication function may fetch the metadata from the authentication server. It should be understood that the aforementioned text, images, and/or notifications are merely illustrative and other images, text, and/or notifications should also be considered to be within the scope of this disclosure.

At step 212, the authentication function may add the second phone number back to the block list any time after the user device receives phone call. For example, the authentication function may add the second phone number back to block list once the user device starts ringing, when the call is ongoing, when the call is completed, or any other time after the second device receives the phone call. As the second phone number is added back to the block list, any incoming phone call from the second phone number may be rejected by the user device. In addition to adding the second phone number back to the block list, the authentication function may remove the second phone number from the identification list. In some embodiments, the authentication function may add the second phone number to the block list and remove the second phone number from the identification list in response to receiving to request from the authentication server. The authentication server may generate the request when the authentication server receives an indication that the phone call has been completed. In some embodiments, the authentication server may generate the request when the authentication server receives an indication that the phone call is ongoing (e.g., the phone call is connected but has not been disconnected). In some embodiments, the authentication server may generate the request when the authentication server receives an indication that he phone call has been placed (e.g., the user device is ringing). The authentication server may receive the indication from the enterprise server and/or the user device.

It should be understood that the above described steps of the method and the devices implementing the steps of the method are merely illustrative and other variations to the steps and devices should be considered to be within the scope of this disclosure. In an embodiment, a phone service provider may maintain a block list and may not route the calls from a phone number in a block list to the user device. In this embodiment, the authentication server may communication with a phone service provider server to add all the phone numbers associated with an enterprise to the block list. When the enterprise indicates to the authentication server that a phone call is being made, the authentication server may transmit a request to the phone service provider server to remove from the block list the phone number from which the call is being made. Once the phone call is ongoing (e.g., the state of the phone call is "connected") or is completed (e.g., the state of the phone call changes from "connected" to "disconnected"), the authentication server may transmit a request to the phone service provider server to add the phone number back to the block list. The authentication server may receive the state of the phone call from the user device and/or the phone service provider server. In some embodiments, the phone service provider server may automatically add the phone number back to the block list once the phone call is ongoing or is completed.

Furthermore, the authentication server may mutually authenticate the user device in addition to the phone call. Once the phone call to the user device is ongoing, the authentication server may transmit a request to the user device to get the user device state. The call states may be, for example, incoming ringing, incoming connected. In some embodiments, the user device may send the state data back to the authentication server when the user device receives the phone call and starts ringing without an additional request from the authentication server, i.e., the user device may send the state data based on previously received requests to modify one or more of the block lists and identification lists. The authentication server may compare the received user device state with the phone call state to authenticate that the user device which received the phone call is the same device that was supposed to receive the phone call and that the phone number has not been ported or the phone call has not been forwarded from the user device. Authentication based on comparing state of a device and the state of a phone call is disclosed in U.S. patent application Ser. No. 16/287,879, which is incorporated by reference herein in its entirety.

Figure 3A:
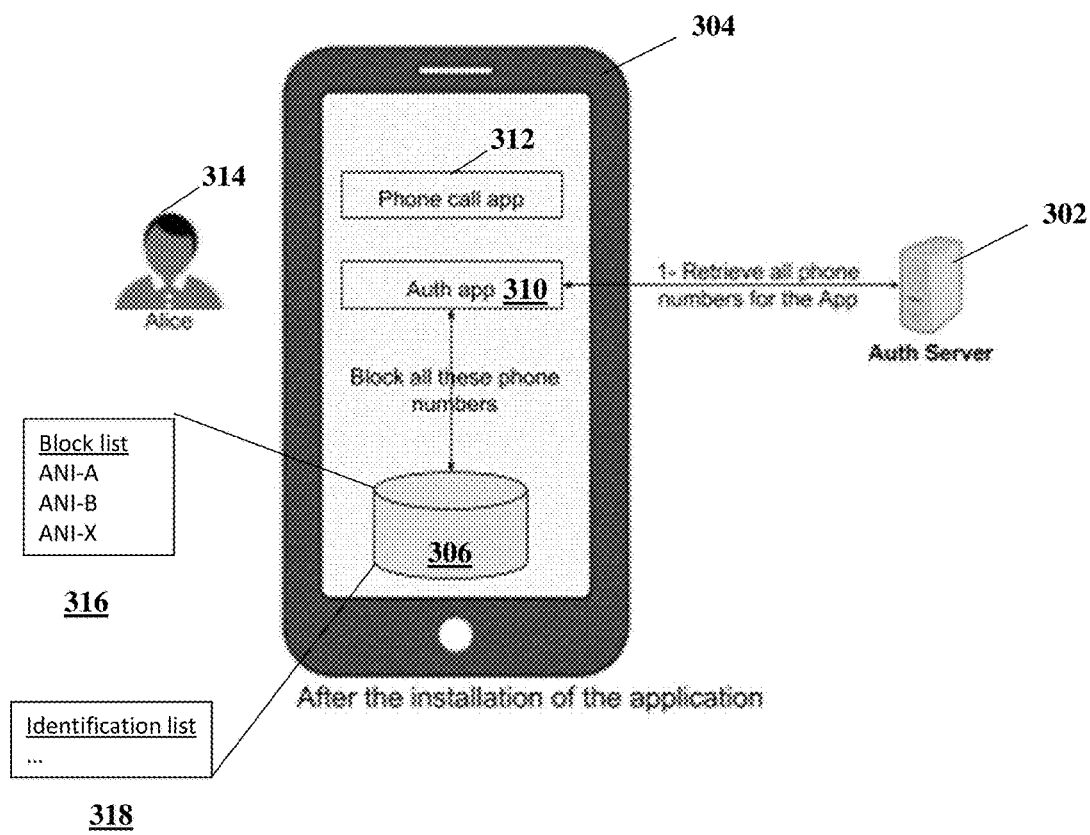
FIG. 3A-3C show process diagrams of an illustrative method of caller ID verification using call identification and block lists, according to an embodiment.
Figure 3B:
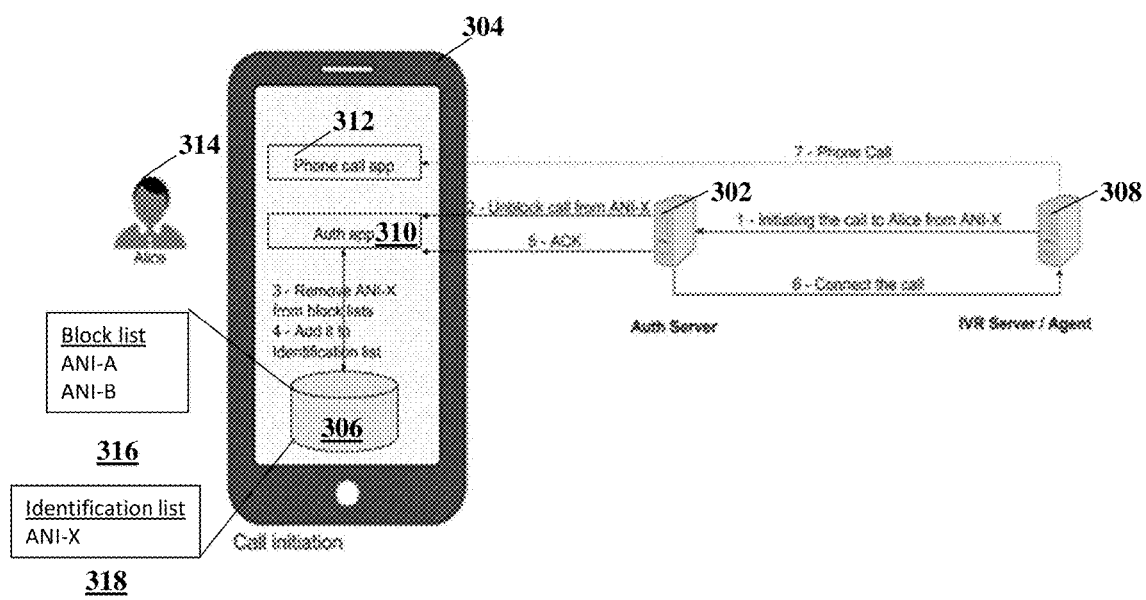
Figure 3C:
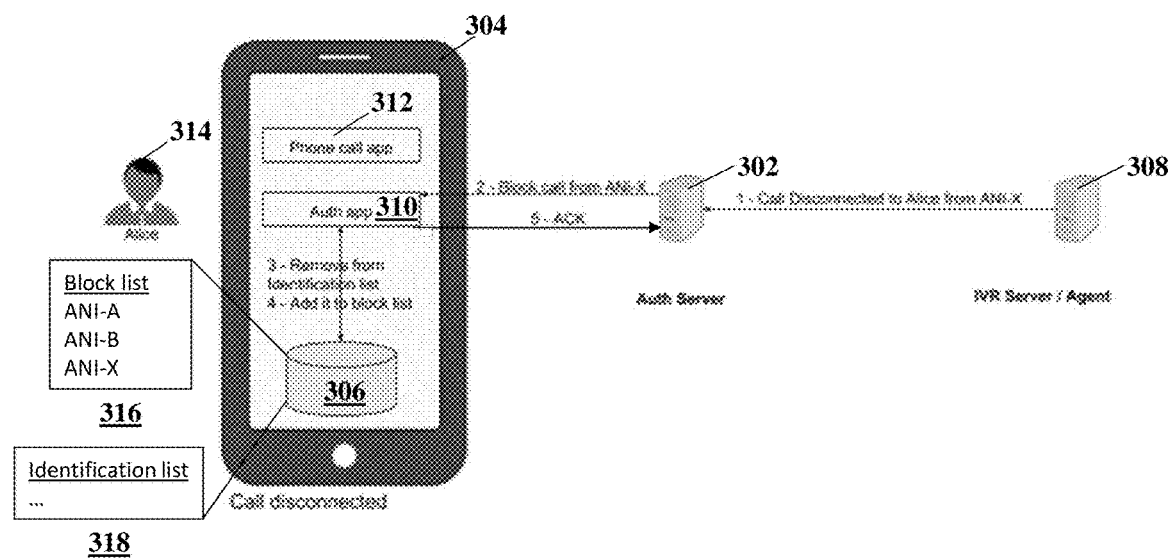

FIGS. 3A-3C show process diagrams of an illustrative method 300 of caller ID verification using block lists and identification lists, according to an embodiment. As shown in FIG. 3A, a user 314 may have an authentication function 310 on a user device such as a mobile phone 304. The authentication function 310 may be implemented by an authentication application. In some embodiments, the authentication application may be a standalone application implementing the authentication function 310. In other embodiments, the authentication application may be another application that may implement the authentication function 310. For example, the authentication application may be an enterprise application such as a bank application. In other embodiments, the authentication function 310 may be implemented by a system service provided by the operating system of the mobile phone 304 and/or a system service provided by a telephone service carrier. In addition, the mobile phone 304 may have a phone call application 312 through which the mobile phone 304 may receive incoming calls and make outgoing calls.

The authentication function 310 on the mobile phone 304 may communicate with an authentication server 302 and fetch (or retrieve) phone numbers (also referred to as Automatic Number Identifications (ANIs) of an enterprise associated with the authentication function 310. For example, the enterprise may have several phone numbers that may be used to call the mobile phone 304 and the authentication function 310 may add all of the several phone numbers into a block list 316 maintained at a storage (or memory) 306 of the mobile device. The storage/memory 306 may include, for example, a hard disk drive, a solid state drive, and/or a random access memory. In some embodiments, the authentication server 302 may transmit a request and the authentication function 310 may add the phone numbers to the block list 316 in response to the request. In some embodiments, the phone numbers may be hardcoded within the authentication function.

In addition to adding the phone numbers to the block list 316, the authentication function 310 may perform one or more operations on a contact list (e.g., a phone book) in the mobile device 304. For example, the authentication function 310 may remove from the contact list all the phone numbers retrieved from the authentication server 302. In some embodiments, the authentication function 310 may perform the removal operation automatically. In other embodiments, the authentication function 310 may prompt the user 314 to remove the phone numbers retrieved from the authentication server 302.

As shown in FIG. 3B, an enterprise server 308 (e.g., an IVR server) or an agent may initiate a call to the user 314 from an Automatic Number Identification (ANI)-X. The enterprise server 308 may transmit a notification to the authentication server 302 that the enterprise server 308 or an agent is in the process of making a phone call to the user 314. In response, the authentication server 302 may transmit a request to the authentication function 310 to remove the ANI-X from the block list 316. In some embodiments, the authentication function 310 may add the ANI-X to an identification list 318. After the authentication function 310 removes the ANI-X from the block list 316 and, optionally, adds the ANI-X to the identification list 318, the authentication function 310 may transmit an acknowledgement message to the authentication server 302. The acknowledgement message may include a confirmation that the authentication function 310 has removed the ANI-X from the block list 316 and, optionally, has added the ANI-X to the identification list 318. In response to receiving the acknowledgement message, the authentication server 302 may transmit a notification to the enterprise server 308 that the enterprise server 308 or the agent can make a phone call to the mobile device 304. Upon receiving the notification, the enterprise server 308 or the agent may make a phone call to the mobile device 304 using ANI-X. Because the ANI-X is no longer in the block list 316 and optionally in the identification list 318, the phone call application 312 in the mobile device 304 may receive an incoming phone call using ANI-X from the enterprise server 308 or the agent. In some embodiments, the mobile device 304 may display a symbol or an image indicating that the incoming call has been verified. For example, the mobile may display a green check mark or a text saying "phone number verified by company-A"

In some embodiments, the request from the authentication server 302 to the authentication function 310 to remove ANI-X from the block list may time out because the authentication server 302 may not receive the corresponding acknowledgement from the authentication function. The timeout may occur when there is a loss of an internet connection between the authentication server 302 and the mobile device 304 or there is a delay in the request reaching the mobile device 304. In these embodiments, the authentication server 302 may transmit a timeout notification to the enterprise server 308 as opposed to the notification that the enterprise server 308 or an agent can make a phone call. In these cases, the enterprise server 308 or the agent may determine whether to place the phone call based on the criticality of the phone call.

As shown in FIG. 3C, after the phone call to the user 314 ends, the enterprise server 308 may send a notification to the authentication server 302 that the call from the enterprise server 308 or the agent to the user 314 has been disconnected. In response, the authentication server 302 may transmit a request to the authentication function 310 in the mobile phone 304 to add the ANI-X to the block list 316. The request may also include a request to the authentication function 310 to remove the ANI-X from the identification list 318. The authentication function 310 may then transmit an acknowledgement to the authentication server 302 that the ANI-X has been added back to the block list 318 and removed from the identification list 318. As a result, any further incoming phone call from ANI-X may be automatically blocked by the mobile phone 304 unless the authentication function 310 receives a request to remove the ANI-X from the block list 316 from the authentication server 302. Because an attacker may not have access to the authentication server 302, a phone call from a spoofed ANI-X is automatically blocked by the mobile phone 304.

In some embodiments, the mobile phone 304 may only maintain the identification list 318 and not necessarily the block list 316. In these embodiments, when the enterprise sever 308 or an agent initiates a phone call to the user 314, the authentication server 302 may transmit a request to the authentication function 310 to add the ANI used for the phone call to the identification list 318. When an incoming phone call is from an ANI in the identification list 318, the mobile phone 304 may indicate to the user 314 that the phone call is from an ANI in the identification list 318. These embodiments may be used when there is a spotty connection between the mobile phone 304 and the authentication server 302. Such spotty connection may not support the communications of multiple messages between the mobile phone 304 and the authentication server 302. A single request or a single message from the authentication server 302 may request the authentication function 310 to add the ANI to the identification list 318. After the phone call is completed, the authentication function 310 may remove the ANI from the identification list without receiving a message from the authentication server 302.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
receiving, by a first computer from a second computer, an indication of an outgoing phone call to a first phone number from a second phone number;
transmitting, by the first computer, a first request to a user device associated with the first phone number to remove the second phone number from a block list maintained at the user device;

in response to the first computer receiving a confirmation message that the user device has removed the second phone number from the block list, transmitting, by the first computer to the second computer, an indication that the outgoing phone call can be placed; and transmitting, by the first computer to the user device, a second request to add the second phone number to the block list such that the user device blocks future calls from the second phone number.

2. The computer-implemented method according to claim 1, wherein the first request includes a request to add the second phone number to an identification list maintained at the user device, wherein the confirmation message includes a confirmation that the user device has added the second phone number to the identification list, and wherein the second request includes a request to remove the second phone number from the identification list.

3. The computer-implemented method according to claim 1, wherein the first request to remove the second phone number from the block list includes a request to disable the block list.

4. The computer-implemented method according to claim 1, further comprising:

transmitting, by the first computer, the second request to the user device when the outgoing call is connected.

5. The computer-implemented method according to claim 1, further comprising:

transmitting, by the first computer, the second request to the user device when the outgoing call is ongoing.

6. The computer-implemented method according to claim 1, further comprising:

transmitting, by the first computer, the second request to the user device when the outgoing call is completed.

7. The computer-implemented method according to claim 1, further comprising:

transmitting, by the first computer, the second request to the user device after a timeout.

8. The computer-implemented method according to claim 1, wherein the first computer and the second computer refer to the same computer.

9. The computer-implemented method according to claim 1, further comprising:

in response to the first computer not receiving the confirmation message that the user device has removed the second phone number from the block list, transmitting, by the first computer to the second computer, a timeout indication.

* * * * *